US011243859B2

(12) United States Patent
Ladkani et al.

(10) Patent No.: US 11,243,859 B2
(45) Date of Patent: Feb. 8, 2022

(54) BASEBOARD MANAGEMENT CONTROLLER THAT INITIATES A DIAGNOSTIC OPERATION TO COLLECT HOST INFORMATION

(71) Applicant: Microsoft Technology Licensing, LLC, Redmond, WA (US)

(72) Inventors: Neeraj Ladkani, Bothell, WA (US); Viswanathan Swaminathan, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 47 days.

(21) Appl. No.: 16/597,760

(22) Filed: Oct. 9, 2019

(65) Prior Publication Data

US 2021/0109832 A1 Apr. 15, 2021

(51) Int. Cl.
*G06F 11/30* (2006.01)
*G06F 11/07* (2006.01)
*G06F 11/22* (2006.01)

(52) U.S. Cl.
CPC ........ *G06F 11/3013* (2013.01); *G06F 11/076* (2013.01); *G06F 11/0772* (2013.01); *G06F 11/0793* (2013.01); *G06F 11/2273* (2013.01); *G06F 11/3041* (2013.01)

(58) Field of Classification Search
CPC ............... G06F 11/3013; G06F 11/076; G06F 11/0772; G06F 11/2273; G06F 11/0793; G06F 11/3041; G06F 11/0766
See application file for complete search history.

(56) References Cited

U.S. PATENT DOCUMENTS

| 10,242,176 | B1 * | 3/2019 | Sathyanarayana | ...... G06F 13/42 |
| 10,521,376 | B1 * | 12/2019 | Mitra | .................... G06F 3/0683 |
| 2004/0267482 | A1 | 12/2004 | Robertson et al. | |
| 2005/0251591 | A1 * | 11/2005 | Hawkins | ............. G06F 11/0751 710/10 |
| 2007/0006307 | A1 | 1/2007 | Hahn et al. | |

(Continued)

OTHER PUBLICATIONS

"International Search Report and Written Opinion Issued in PCT Application No. PCT/US20/051346", dated Nov. 27, 2020, 14 Pages.

*Primary Examiner* — Yolanda L Wilson
(74) *Attorney, Agent, or Firm* — Ray Quinney & Nebeker P.C; James Bullough

(57) ABSTRACT

A baseboard management controller (BMC) may be configured to enable a communication interface from the BMC to a host processor on a host computing device and provide input to the host processor via the communication interface. The input causes at least one diagnostic operation to be performed on the host computing device. The BMC may collect host information in response to the diagnostic operation(s) being performed. The BMC may report the host information to another entity and/or store the host information in persistent memory within the BMC. In some embodiments, the input may be provided to the host processor in response to receiving a signal from a fabric controller. In some embodiments, the input may be provided to the host processor in response to detecting an anomaly associated with the host computing device. The BMC may take at least one action to mitigate the anomaly.

17 Claims, 12 Drawing Sheets

(56) References Cited

U.S. PATENT DOCUMENTS

| | | |
|---|---|---|
| 2008/0313312 A1 | 12/2008 | Flynn et al. |
| 2012/0131371 A1* | 5/2012 | Liu .................... G06F 11/3089 |
| | | 713/340 |
| 2013/0151841 A1* | 6/2013 | McGraw ............... H04L 41/082 |
| | | 713/100 |
| 2014/0115386 A1* | 4/2014 | Huang ................ G06F 11/1402 |
| | | 714/15 |
| 2014/0173365 A1* | 6/2014 | Itozawa ............. G06F 11/0793 |
| | | 714/48 |
| 2015/0074323 A1 | 3/2015 | Chumbalkar et al. |
| 2017/0102985 A1* | 4/2017 | Song .................... G06F 11/079 |
| 2017/0139797 A1* | 5/2017 | Wang ................. G06F 11/3055 |
| 2018/0074717 A1* | 3/2018 | Olarig ................ G06F 11/0757 |
| 2019/0007341 A1* | 1/2019 | Clarke ................... H04L 67/10 |
| 2019/0042348 A1* | 2/2019 | Krithivas ............ G06F 11/0721 |
| 2019/0238484 A1 | 8/2019 | Clarke et al. |
| 2019/0303315 A1* | 10/2019 | Shih .................. G06F 13/4022 |
| 2020/0073656 A1* | 3/2020 | Satapathy ........... G06F 11/0766 |

\* cited by examiner

BASEBOARD MANAGEMENT CONTROLLER THAT INITIATES A DIAGNOSTIC OPERATION TO COLLECT HOST INFORMATION

CROSS-REFERENCE TO RELATED APPLICATIONS

N/A

BACKGROUND

Cloud computing is the delivery of computing services (e.g., servers, storage, databases, networking, software, analytics) over the Internet. Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware.

The back end of a cloud computing system typically includes one or more data centers, which may be located in different geographical areas. Each data center typically includes a large number (e.g., hundreds or thousands) of host computing devices. Each host computing device runs a hypervisor that hosts virtual machines. In this context, the term "host computing device" refers to a physical computer system, while the term "virtual machine" refers to an emulation of a computer system on a host computing device. In other words, a virtual machine is a program running on a host computing device that acts like a virtual computer. Like a physical computer, a virtual machine runs an operating system and one or more applications.

The back end of a cloud computing system typically includes a fabric controller that, among other things, monitors the health of host computing devices. For example, the operating system on a host computing device may include a host agent that is responsible for determining information about the health of the host computing device and for reporting that information to the fabric controller.

In a cloud computing environment, the availability of host computing devices can be extremely important. With current approaches, however, the fabric controller may not always be able to determine information about the health of a host computing device. For example, a network connection between the fabric controller and a host computing device may become unavailable. As another example, the host agent may malfunction. Accordingly, benefits may be realized by improved techniques for determining information about the health of a host computing device.

SUMMARY

In accordance with one aspect of the present disclosure, a baseboard management controller (BMC) is disclosed that includes a processor and memory in electronic communication with the processor. The BMC also includes instructions stored in the memory and executable by the processor to enable a communication interface from the BMC to a host processor on a host computing device and provide input to the host processor via the communication interface. The input causes at least one diagnostic operation to be performed on the host computing device. The instructions are also executable to collect host information in response to the at least one diagnostic operation.

In some embodiments, the input can be provided to the host processor in response to receiving a signal from a fabric controller. In some embodiments, the input can be provided to the host processor in response to determining that a heartbeat signal has not been received from a host agent on the host computing device within a pre-defined time period. In some embodiments, the input can be provided to the host processor in response to detecting an anomaly associated with the host computing device.

The BMC can further include additional instructions that are executable by the processor to determine, based on the host information and also based on at least one anomaly rule, that an anomaly associated with the host computing device has occurred. The instructions can additionally be executable to take at least one action to mitigate the anomaly.

The input can cause a diagnostic agent on the host computing device to be executed by the host processor. The at least one diagnostic operation can be performed via execution of the diagnostic agent.

The host computing device can communicate with a fabric controller via a data plane communication channel. The BMC can further include additional instructions that are executable to send the host information to the fabric controller via a control plane communication channel that is separate from the data plane communication channel.

The BMC can further include persistent memory and additional instructions that are executable to store the host information in the persistent memory.

The communication interface can include a Universal Serial Bus (USB) interface. Enabling the communication interface can include causing the host processor to enumerate a USB input device.

The communication interface can include a Peripheral Component Interconnect Express (PCI-e) interface. Enabling the communication interface can include causing the host processor to enumerate a PCI-e endpoint.

In accordance with another aspect of the present disclosure, a host computing device is disclosed that includes a host processor and memory in electronic communication with the host processor. The host computing device also includes a diagnostic agent stored in the memory and executable by the host processor to perform at least one diagnostic operation on the host computing device. The host computing device also includes a baseboard management controller (BMC) that is configured to enable a communication interface from the BMC to the host processor and provide input to the host processor via the communication interface. The input is configured to cause the diagnostic agent to perform the at least one diagnostic operation. The BMC is also configured to collect host information in response to the at least one diagnostic operation.

In some embodiments, the input can be provided to the host processor in response to receiving a signal from a fabric controller. In some embodiments, the input can be provided to the host processor in response to detecting an anomaly associated with the host computing device.

The host computing device can further include a host agent stored in the memory and executable by the host processor to send a heartbeat signal to the BMC. The input can be provided to the host processor in response to determining that the heartbeat signal has not been received from the host agent within a pre-defined time period.

The BMC can be additionally configured to determine, based on the host information and also based on at least one anomaly rule, that an anomaly associated with the host computing device has occurred. The BMC can be additionally configured to take at least one action to mitigate the anomaly.

The input can cause the diagnostic agent to be executed by the host processor. The at least one diagnostic operation can be performed via execution of the diagnostic agent.

The host computing device can communicate with a fabric controller via a data plane communication channel. The BMC can be additionally configured to send the host information to the fabric controller via a control plane communication channel that is separate from the data plane communication channel.

The BMC can further include persistent memory. The BMC can be additionally configured to store the host information in the persistent memory.

In accordance with another aspect of the present disclosure, a fabric controller is disclosed that includes a data plane interface that facilitates communication with a host computing device via a data plane communication channel, a control plane interface that facilitates communication with a baseboard management controller (BMC) on the host computing device via a control plane communication channel, a processor, memory in electronic communication with the processor, and instructions stored in the memory. The instructions are executable by the processor to send a signal to the BMC via the control plane interface. The signal causes the BMC to initiate at least one diagnostic operation on the host computing device. The instructions are also executable by the processor to receive host information from the BMC via the control plane interface.

In some embodiments, the signal can be sent in response to detecting that the host computing device is not accessible via the data plane interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
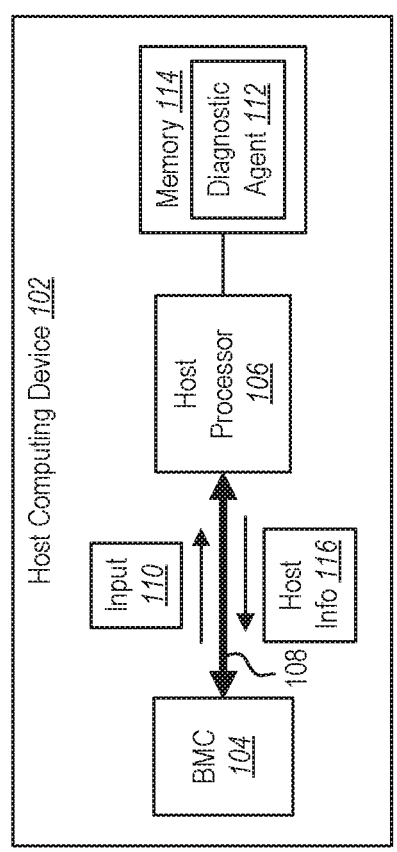
FIG. 1 illustrates an example of a BMC that is configured to initiate one or more diagnostic operations on a host computing device in accordance with the present disclosure.

As indicated above, the present disclosure is generally related to improved techniques for determining information about the health of a host computing device in a cloud computing system. The techniques disclosed herein involve a baseboard management controller (BMC), which is a specialized microcontroller that is embedded on the motherboard of a host computing device.

In accordance with one aspect of the present disclosure, a BMC on a host computing device may initiate one or more diagnostic operations that can be performed with respect to the host computing device. For example, a BMC may enable a communication interface from the BMC to a host processor on the host computing device. In some embodiments, enabling the communication interface may include causing the host processor to enumerate a particular type of device (e.g., a USB input device, a PCI-e endpoint device). The BMC may then provide input to the host processor via the communication interface. The input may cause one or more diagnostic operations to be performed with respect to the host computing device. The BMC may then collect information about the host computing device in response to the diagnostic operation(s) being performed, and this information may be reported to another entity (e.g., a fabric controller) and/or stored on the BMC itself.

There are many different reasons why a BMC may initiate diagnostic operations with respect to a host computing device. For example, a BMC may initiate diagnostic operations with respect to a host computing device in response to receiving a signal from another entity, such as a fabric controller. In some embodiments, if a network connection between the fabric controller and the host computing device is lost, the fabric controller may send a signal to the BMC via an out-of-band communication channel (e.g., a control plane communication channel).

As another example, a BMC may initiate diagnostic operations with respect to a host computing device in response to detecting an anomaly associated with the host computing device. In this context, the term "anomaly" may refer to a deviation from the normal or typical operation of the host computing device. Some examples of anomalies include an operating system (OS) on the host computing device becoming unresponsive (e.g., "hanging"), and malicious agents or bugs causing OS instability or performance impact. Specific rules may be defined that indicate when an anomaly has occurred on the host computing device.

In some embodiments, a BMC may proactively initiate diagnostic operations with respect to a host computing device in an effort to identify and fix issues with a host computing device before they become serious problems. In such embodiments, a BMC may initiate diagnostic operations with respect to a host computing device without being instructed to do so by another entity and without first detecting an anomaly associated with the host computing device. For example, a BMC may be configured to periodically initiate diagnostic operations with respect to a host computing device in order to determine whether an anomaly associated with the host computing device has occurred. If the BMC determines that an anomaly associated with the host computing device has occurred, the BMC may take one or more mitigating actions in an effort to address the anomaly.

As indicated above, in some embodiments a host computing device may include a host agent that is responsible for determining information about the health of the host computing device and for reporting that information to another entity, such as a fabric controller. The host agent may be configured to provide at least two different heartbeat signals. For example, the host agent may be configured to provide a heartbeat signal to the fabric controller. The host agent may also be configured to provide a heartbeat signal to the BMC on the host computing device. In this context, the term "heartbeat signal" may refer to a signal that is sent periodically. Both the fabric controller and the BMC may expect to receive the heartbeat signal from the host agent at regular intervals. If the fabric controller does not receive the heartbeat signal from the host agent when expected, then the fabric controller may instruct the BMC (e.g., via a control plane communication channel) to initiate diagnostic operations. If the BMC does not receive the heartbeat signal from the host agent when expected, then the BMC may initiate diagnostic operations.

The techniques disclosed herein may be utilized in a cloud computing system in which a fabric controller is responsible for managing a large number of host computing devices. From time to time, BMCs on the various host computing devices may determine host information and report the host information to the fabric controller. Thus, the fabric controller may collect host information from a plurality of host computing devices. Machine learning techniques may be utilized to analyze the host information and determine information that can improve the performance of the cloud computing system.

FIG. 1 illustrates an example of a BMC 104 that is configured to initiate one or more diagnostic operations on a host computing device 102 in accordance with the present disclosure. The host computing device 102 includes a processor 106, which will be referred to herein as a host processor 106. The BMC 104 may enable a communication interface 108 from the BMC 104 to the host processor 106.

In other words, the BMC 104 may activate the communication interface 108 or make the communication interface 108 operational.

In this context, the term "communication interface" may refer generally to a point of interaction between separate components of a computer system. In other words, a communication interface facilitates communication between separate components of a computer system. A communication interface may include hardware and/or software components.

The communication interface 108 shown in FIG. 1 is a point of interaction between the BMC 104 and the host processor 106. In other words, the communication interface 108 facilitates communication between the BMC 104 and the host processor 106. In some embodiments, enabling the communication interface 108 involves creating a logical connection between the BMC 104 and the host processor 106, such that the BMC 104 can provide input 110 to the host processor 106 via the communication interface 108. The communication interface 108 from the BMC 104 to the host processor 106 can be thought of as a virtual communication interface 108.

In some embodiments, enabling the communication interface 108 may include causing the host processor 106 to enumerate a particular type of device. In other words, enabling the communication interface 108 may include causing the host processor 106 to recognize the BMC 104 as a particular type of device. For example, the BMC 104 may cause the host processor 106 to enumerate a USB input device (e.g., a keyboard, a mouse), such that the host processor 106 interacts with the BMC 104 as if the BMC 104 were a USB input device. In this scenario, the communication interface 108 would be a USB interface. Alternatively, the BMC 104 may cause the host processor 106 to enumerate a Peripheral Component Interconnect Express (PCI-e) endpoint device, such that the host processor 106 interacts with the BMC 104 as if the BMC 104 were a PCI-e endpoint device. In this scenario, the communication interface 108 would be a PCI-e interface.

In this context, the term "enumeration" (and grammatical variants thereof) may refer to the process whereby the host processor 106 detects the presence of a device and performs the necessary operations to ensure that the device is added to a list of endpoints that are serviced by the host processor 106. To cause the host processor 106 to enumerate a particular type of device, the BMC 104 may send the host processor 106 a signal that causes the host processor 106 to request additional information from the BMC 104. The BMC 104 may respond to the requests for additional information as if the BMC 104 were the desired type of device (e.g., a USB device, a PCI-e device).

Once the communication interface 108 from the BMC 104 to the host processor 106 has been enabled, the BMC 104 may provide input 110 to the host processor 106 via the communication interface 108. The type of input 110 that the BMC 104 provides to the host processor 106 may depend on the type of device that the BMC 104 has caused the host processor 106 to enumerate and the type of interface 108 that has been enabled. For example, if the BMC 104 has caused the host processor 106 to enumerate a USB keyboard, then the input 110 may include a sequence of keystrokes.

The input 110 may cause one or more diagnostic operations to be performed on the host computing device 102. In this context, the term "diagnostic operation" may refer generally to any action that determines information about operating characteristics of the host computing device 102. Some examples of diagnostic operations that may be performed include determining whether the host processor 106 is accessible via the communication interface 108, determining a utilization level of the host processor 106, determining information (e.g., usage information) about memory 114 within the host computing device 102, determining whether other devices (e.g., storage devices, peripheral devices) are connected to the host computing device 102 and accessible to the host processor 106, determining what processes and/or threads are currently running on the host computing device 102, determining the content of registers on the host computing device 102, determining a current temperature of the host processor 106, determining the network throughput/bandwidth of the host computing device 102, determining statistics related to a hypervisor that is running on the host computing device 102, and determining the amount of free space in the host computing device 102 (e.g., in the memory 114 of the host computing device 102 and/or in storage within the host computing device 102).

In the depicted example, a diagnostic agent 112 is stored in memory 114 of the host computing device 102. The diagnostic agent 112 may be configured to perform one or more diagnostic operations. In some embodiments, the input 110 from the BMC 104 via the communication interface 108 may cause the diagnostic agent 112 to be started and executed by the host processor 106, thereby causing the diagnostic operation(s) to be performed.

In some embodiments, the diagnostic agent 112 may be a command-line interface program. In such embodiments, the input 110 may include (i) a first portion that causes the command-line interface program to be started, and (ii) a second portion that includes one or more commands for the command-line interface program. The command(s) may cause the diagnostic operation(s) to be performed.

Alternatively, in other embodiments, the diagnostic agent 112 may be a program that is configured to perform a pre-defined diagnostic sequence when the diagnostic agent 112 is started. In such embodiments, the input 110 may simply cause the diagnostic agent 112 to be started.

The BMC 104 can collect information 116 about the host computing device 102 in response to the diagnostic operation(s) that are performed. This information 116 may be referred to herein as host information 116. In this context, the term "host information" refers generally to any information about operating characteristics of the host computing device 102 that is determined in response to one or more diagnostic operations. Some examples of host information that may be determined from diagnostic operations include information indicating whether the host processor 106 is accessible via the communication interface 108, information about a utilization level of the host processor 106, information indicating whether other devices (e.g., storage devices, peripheral devices) are connected to the host computing device 102 and accessible to the host processor 106, information about what processes are currently running on the host computing device 102, and information about a current temperature of the host processor 106.

The BMC 104 may receive the host information 116 from the diagnostic agent 112 via the communication interface 108. In some embodiments, the BMC 104 may cause the host processor 106 to enumerate a virtual storage device (e.g., a virtual hard drive). This may occur, for example, using a USB interface. The host information 116 may then be provided to the BMC 104 as one or more files.

The BMC 104 can use the host information 116 in a variety of different ways. For example, the BMC 104 can report the host information 116 to another entity, such as a fabric controller. As another example, the BMC 104 can store the host information 116 in persistent memory within the BMC 104 itself. In some embodiments, the BMC 104 can store the host information 116 in one or more entries in a system event log (SEL).

Figure 2:
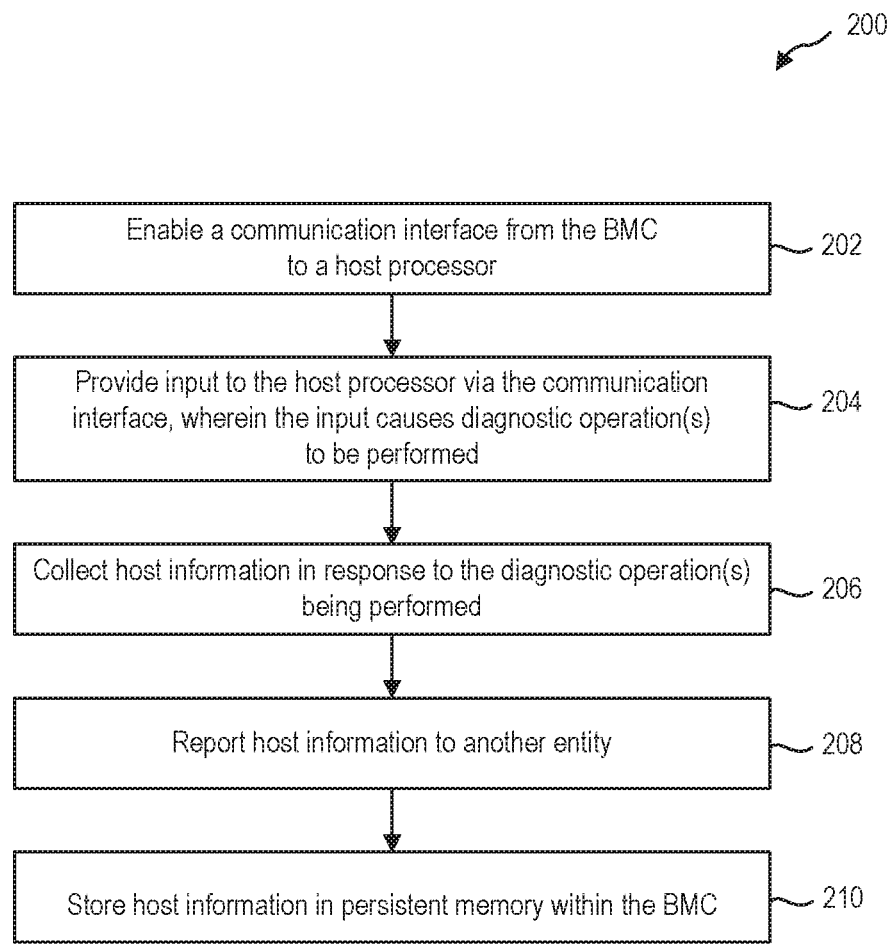
FIG. 2 illustrates an example of a method that may be performed by a BMC in accordance with the present disclosure.

FIG. 2 illustrates an example of a method 200 that may be performed by a BMC 104 in accordance with the present disclosure. The method 200 will be described in relation to the BMC 104 in the host computing device 102 shown in FIG. 1.

The method 200 includes enabling 202 a communication interface 108 from the BMC 104 to a host processor 106 on a host computing device 102. As discussed above, this may involve causing the host processor 106 to enumerate a particular type of device (e.g., a USB input device, a PCI-e endpoint device) and to interact with the BMC 104 as if the BMC 104 were the enumerated device.

The method 200 also includes providing 204 input 110 to the host processor 106 via the communication interface 108. The input 110 causes one or more diagnostic operations to be performed on the host computing device 102. For example, the input 110 may cause a diagnostic agent 112 on the host computing device 102 to be executed by the host processor 106. In some embodiments, the diagnostic agent 112 may be a command-line interface program, and the input 110 may include commands for the command-line interface program that cause the diagnostic operation(s) to be performed. In other embodiments, the diagnostic agent 112 may be a program that is configured to perform a pre-defined diagnostic sequence when the diagnostic agent 112 is launched.

The method 200 also includes collecting 206 host information 116 in response to the diagnostic operation(s) being performed. The BMC 104 may receive the host information 116 from the diagnostic agent 112 via the communication interface 108. The BMC 104 may report 208 the host information 116 to another entity, such as a fabric controller. The BMC 104 may also store 210 the host information 116 in persistent memory within the BMC 104 itself. Of course, it is not necessary for the BMC 104 to both report 208 the host information 116 to another entity and also store 210 the host information 116 in the BMC 104. In some embodiments, the BMC 104 may either report 208 the host information 116 to another entity or store 210 the host information 116 in the BMC 104.

Figure 3:
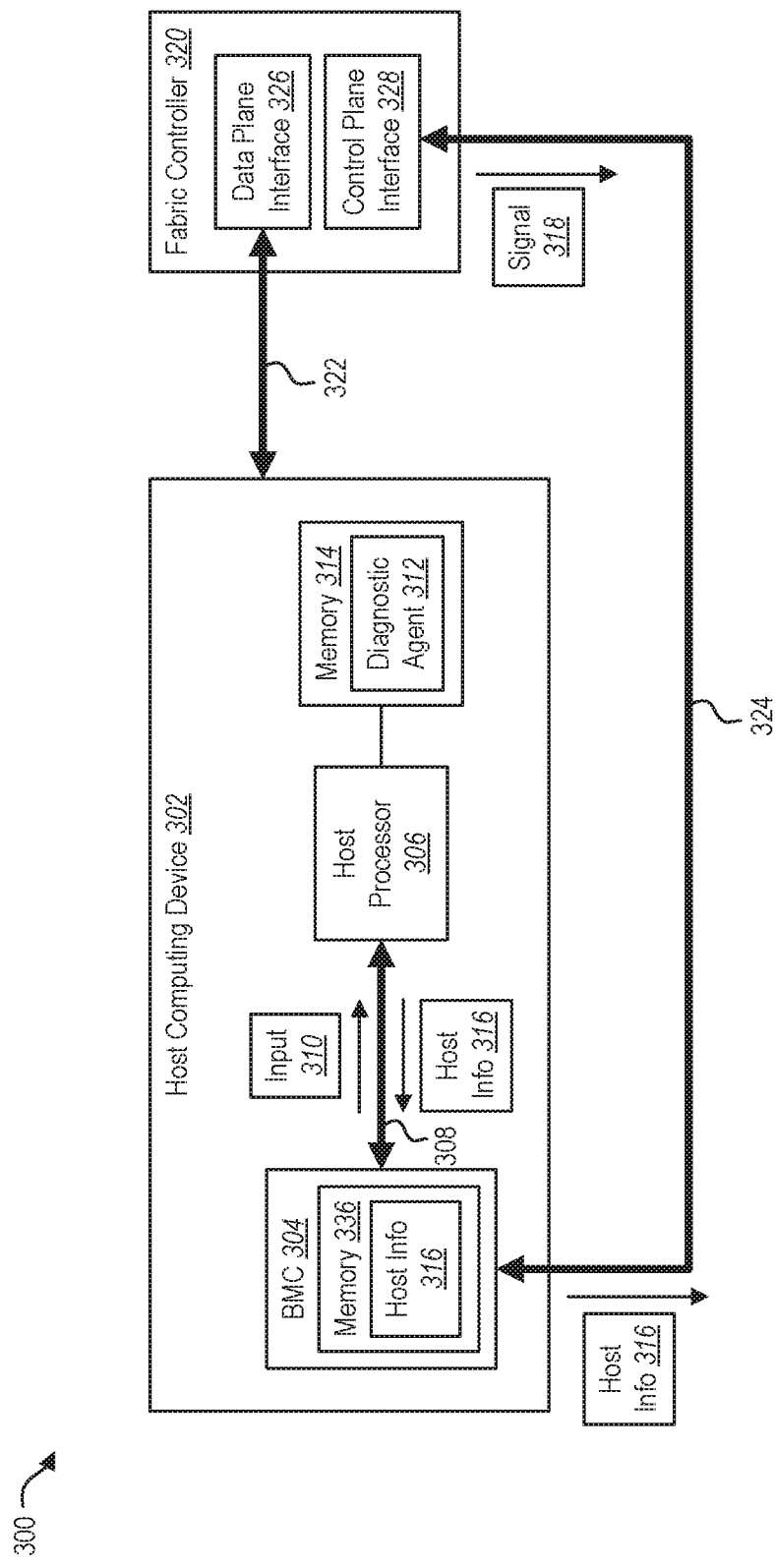
FIG. 3 illustrates an example of a system in which a BMC initiates diagnostic operations with respect to a host computing device in response to receiving a signal from a fabric controller.

FIG. 3 illustrates an example of a system 300 in which a BMC 304 initiates diagnostic operations with respect to a host computing device 302 in response to receiving a signal 318 from a fabric controller 320. In the depicted system 300, there are two different communication channels 322, 324 between the fabric controller 320 and the host computing device 302. A first communication channel 322 is established via a data plane, and may be referred to herein as a data plane communication channel 322. A second communication channel 324 is established via a control plane, and may be referred to herein as a control plane communication channel 324. The control plane communication channel 324 facilitates communication between the fabric controller 320 and the BMC 304 on the host computing device 302.

The fabric controller 320 includes two different communication interfaces that facilitate communication with the host computing device 302 via the communication channels 322, 324. In particular, the fabric controller 320 includes a communication interface 326 that facilitates communication with the host computing device 302 via the data plane communication channel 322. This communication interface 326 may be referred to herein as a data plane interface 326. The fabric controller 320 also includes a communication interface 328 that facilitates communication with the BMC 304 on the host computing device 302 via the control plane communication channel 324. This communication interface 328 may be referred to herein as a control plane interface 328.

Under some circumstances, the fabric controller 320 may send a signal 318 to the BMC 304 that causes the BMC 304 to initiate one or more diagnostic operations on the host computing device 302. The signal 318 may be sent to the BMC 304 via the control plane interface 328 and the control plane communication channel 324.

In some embodiments, a communication interface 308 from the BMC 304 to the host processor 306 may have previously been enabled when the BMC 304 receives the signal 318 from the fabric controller 320. In this case, in response to receiving the signal 318, the BMC 304 may provide input 310 to the host processor 306 via the communication interface 308. The input 310 may cause one or more diagnostic operations to be performed on the host computing device 302 in the manner described above.

Alternatively, in other embodiments, a communication interface 308 from the BMC 304 to the host processor 306 may not have previously been enabled when the BMC 304 receives the signal 318 from the fabric controller 320. In this case, in response to receiving the signal 318, the BMC 304 may enable the communication interface 308 from the BMC 304 to the host processor 306 and then provide input 310 to the host processor 306 via the communication interface 308.

Once the diagnostic operation(s) have been performed on the host computing device 302, the BMC 304 can then collect host information 316. The host information 316 may be received, for example, from a diagnostic agent 312 that is stored in memory 314 of the host computing device 302 and executed by the host processor 306. Once the host information 316 has been collected, the BMC 304 can then send the host information 316 to another entity, such as the fabric controller 320. FIG. 3 shows the fabric controller 320 receiving the host information 316 from the BMC 304 via the control plane communication channel 324 and the control plane interface 328. The host information 316 may also be stored in persistent memory 336 within the BMC 304 or elsewhere.

There are various reasons why the fabric controller 320 may send a signal 318 to the BMC 304 that causes the BMC 304 to initiate diagnostic operation(s) on the host computing device 302. For example, the fabric controller 320 may send such a signal 318 to the BMC 304 in response to detecting that the host computing device 302 is not accessible via the data plane interface 326.

Figure 4:
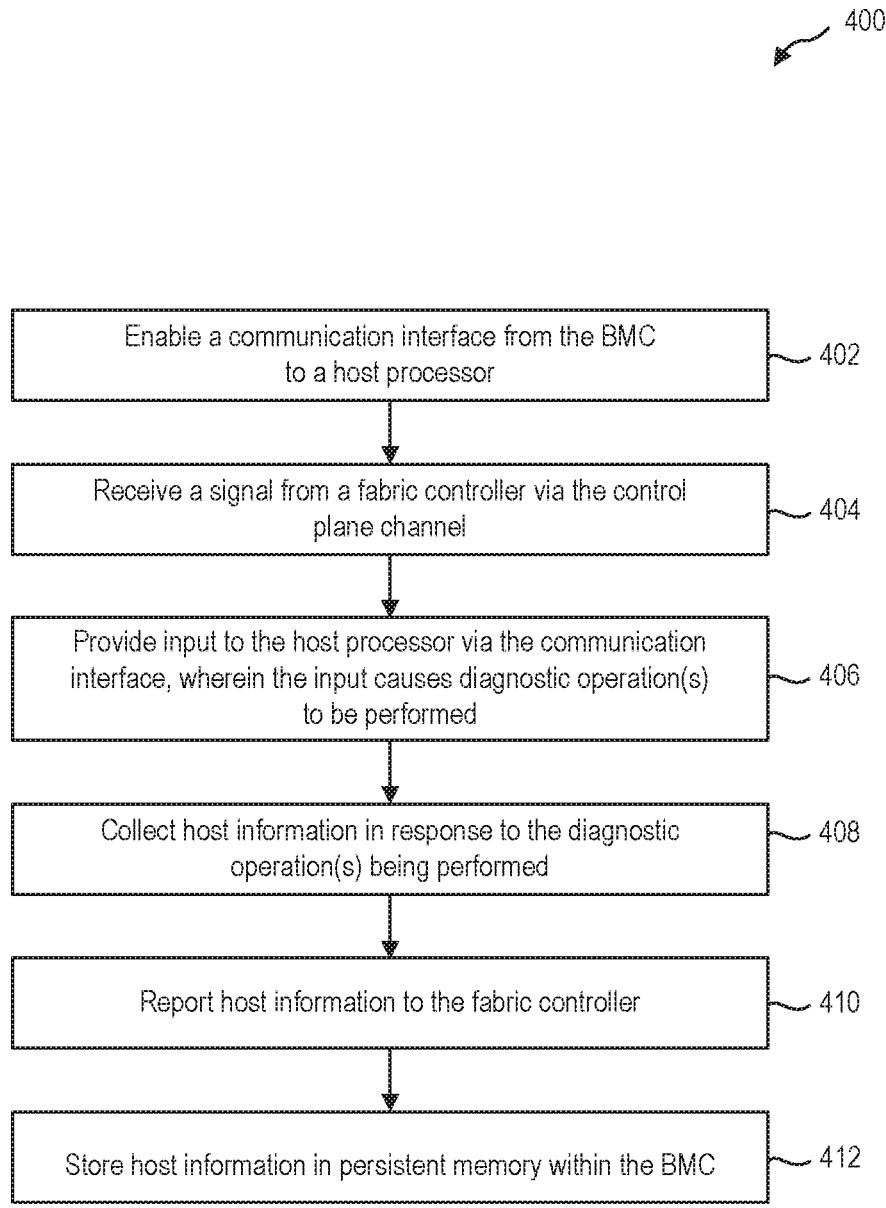
FIG. 4 illustrates an example of a method that may be performed by the BMC in the system shown in FIG. 3.

FIG. 4 illustrates an example of a method 400 in which a BMC 304 initiates diagnostic operations with respect to a host computing device 302 in response to receiving a signal 318 from a fabric controller 320. The method 400 will be described in relation to the system 300 shown in FIG. 3. The method 400 may be performed by a BMC 304.

In accordance with the method 400, the BMC 304 enables 402 a communication interface 308 from the BMC 304 to a host processor 306 on a host computing device 302. As discussed above, enabling 402 the communication interface 308 may include causing the host processor 306 to enumerate a particular type of device (e.g., a USB input device, a PCI-e endpoint device).

The fabric controller 320 may determine whether the host computing device 302 is accessible via the data plane communication channel 322. There are many different ways that the fabric controller 320 can make this determination. For example, the fabric controller 320 may periodically attempt to send the host computing device 302 a signal via the data plane interface 326 and the data plane communication channel 322. As long as the host computing device 302 responds to these signals via the data plane communication channel 322, then the fabric controller 320 may determine that the host computing device 302 is accessible. If, however, the host computing device 302 does not respond to a particular signal within a certain period of time, then the fabric controller 320 may determine that the host computing device 302 is not accessible via the data plane communication channel 322.

As another example, the host computing device 302 may periodically send the fabric controller 320 a signal (without first receiving a signal from the fabric controller 320) via the data plane communication channel 322. As long as the fabric controller 320 continues to receive these signals from the host computing device 302, then the fabric controller 320 may determine that the host computing device 302 is accessible via the data plane communication channel 322. If, however, the fabric controller 320 does not receive a signal from a host computing device 302 within a certain time period, then the fabric controller 320 may determine that the host computing device 302 is not accessible via the data plane communication channel 322. Alternatively, if the fabric controller 320 does not receive a signal from a host computing device 302 within a certain time period, then the fabric controller 320 may attempt to send the host computing device 302 a signal via the data plane interface 326 and the data plane communication channel 322. If the fabric controller 320 does not receive a response to that signal, then the fabric controller 320 may determine that the host computing device 302 is not accessible via the data plane communication channel 322.

If the fabric controller 320 determines that the host computing device 302 is not accessible via the data plane communication channel 322, then the fabric controller 320 may send a signal 318 to the BMC 304 via the control plane interface 328 and the control plane communication channel 324. Thus, the method 400 includes receiving 404 a signal 318 from the BMC 304 via the control plane interface 328 and the control plane communication channel 324. The signal 318 may instruct the BMC 304 to initiate one or more diagnostic operations in an attempt to find out why the host computing device 302 is not accessible via the data plane communication channel 322. In response to receiving 404 this signal 318 from the fabric controller 320, the BMC 304 may provide 406 input 310 to the host processor 306 via the communication interface 308. The input 310 may cause one or more diagnostic operations to be performed on the host computing device 302, as described above. The diagnostic operation(s) may be performed by a diagnostic agent 312 on the host computing device 302.

The BMC 304 may then collect 408 host information 316 in response to the diagnostic operation(s) being performed. The BMC 304 may receive the host information 316 from the diagnostic agent 312 via the communication interface 308. The BMC 304 can report 410 the host information 316 to another entity, such as a fabric controller 320. The BMC 304 can send the host information 316 to the fabric controller 320 via the control plane communication channel 324. The BMC 304 can also store 412 the host information 316 in persistent memory 336 within the BMC 304 itself.

In the method 400 shown in FIG. 4, the BMC 304 enables 402 the communication interface 308 from the BMC 304 to the host processor 306 before the BMC 304 receives 404 the signal 318 from the fabric controller 320 that causes the BMC 304 to initiate one or more diagnostic operations on the host computing device 302. In an alternative embodiment, the BMC 304 may enable 402 the communication interface 308 after receiving 404 the signal 318 from the fabric controller 320.

Figure 5:
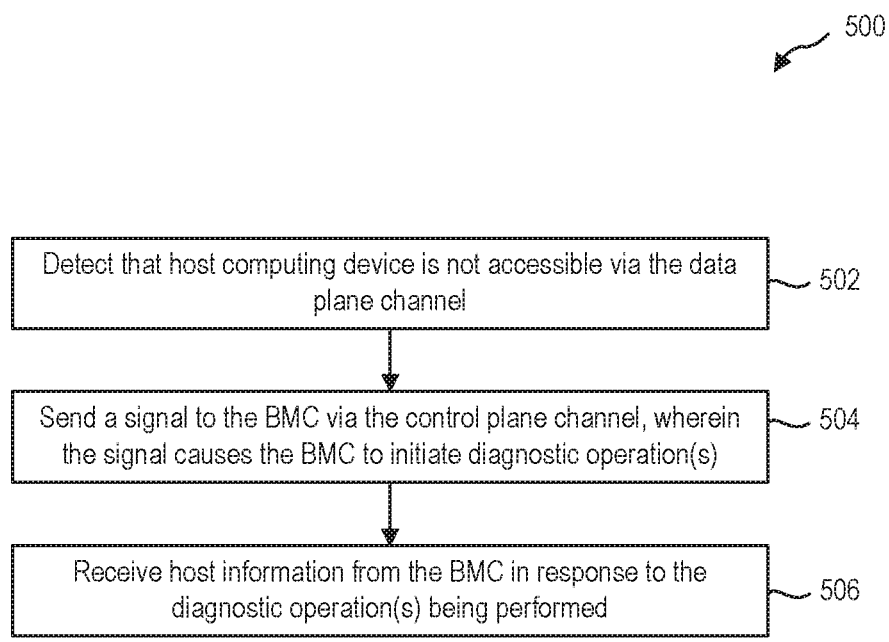
FIG. 5 illustrates an example of a method that may be performed by the fabric controller in the system shown in FIG. 3.

FIG. 5 illustrates an example of a method 500 that may be performed by the fabric controller 320 in the system 300 shown in FIG. 3. In accordance with the method 500, the fabric controller 320 may detect 502 that the host computing device 302 is not accessible via the data plane communication channel 322. Several different techniques for determining whether the host computing device 302 is accessible via the data plane communication channel 322 were described above.

In response to detecting 502 that the host computing device 302 is not accessible via the data plane communication channel 322, the fabric controller 320 may send 504 a signal 318 to the BMC 304 via the control plane communication channel 324. As discussed above, the signal 318 may instruct the BMC 304 to initiate one or more diagnostic operations in an attempt to find out why the host computing device 302 is not accessible via the data plane communication channel 322. In response to receiving this signal 318 from the fabric controller 320, the BMC 304 may initiate one or more diagnostic operations. The BMC 304 may then collect host information 316 in response to the diagnostic operation(s) being performed and report this host information 316 to the fabric controller 320. Thus, the method 500 may include receiving 506 host information 316 from the BMC 304 in response to the diagnostic operation(s) being performed.

Figure 6:
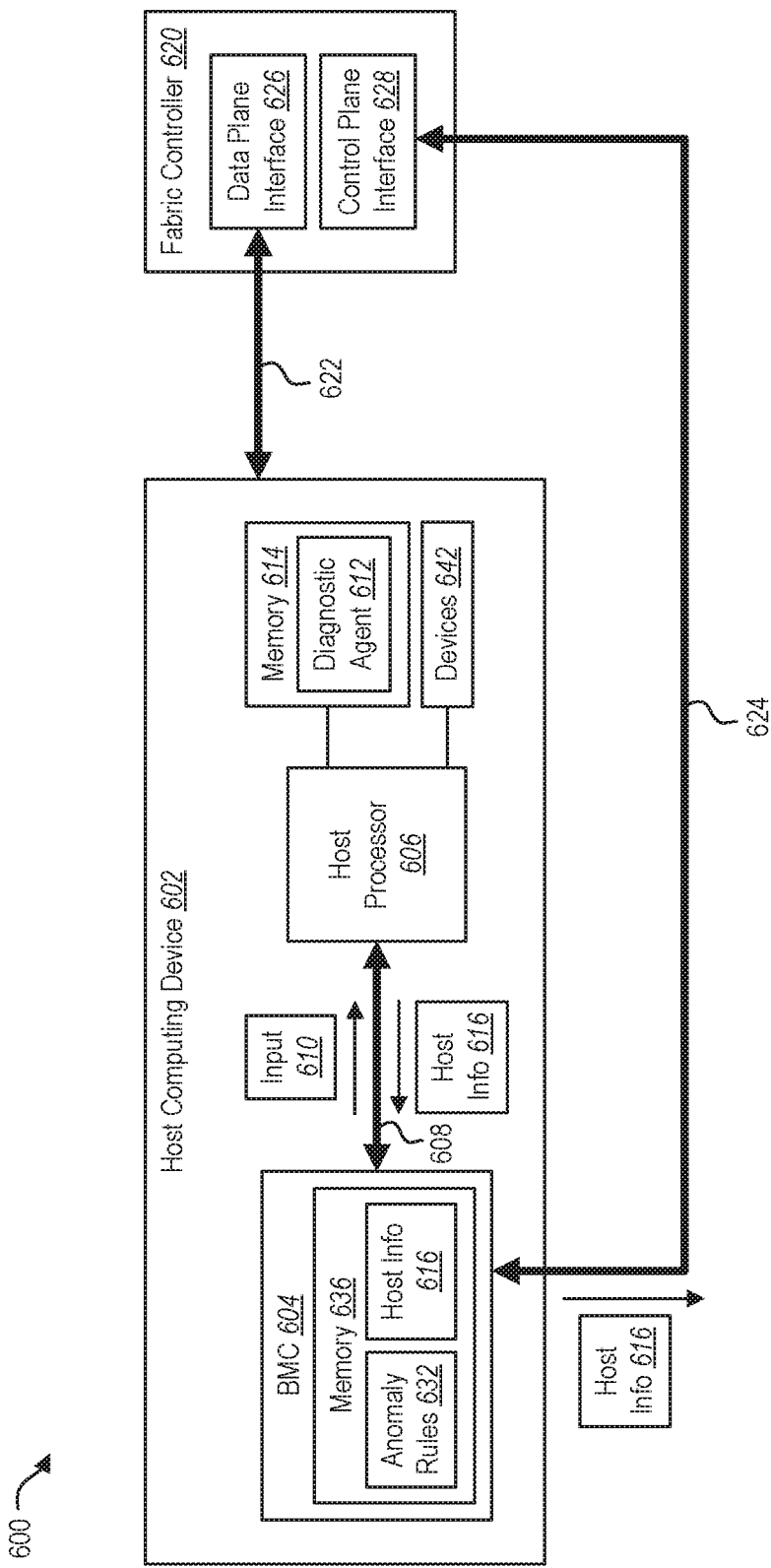
FIG. 6 illustrates an example of a system in which a BMC initiates diagnostic operations with respect to a host computing device in response to detecting an anomaly associated with the host computing device.

FIG. 6 illustrates an example of a system 600 in which a BMC 604 initiates diagnostic operations with respect to a host computing device 602 in response to detecting an anomaly associated with the host computing device 602.

In the depicted system 600, one or more rules 632 have been defined that indicate when an anomaly associated with the host computing device 602 has occurred. Such rules 632 may be referred to herein as anomaly rules 632. The anomaly rules 632 may be included in the BMC 604 itself. FIG. 6 shows the anomaly rules 632 included in memory 636 within the BMC 604. Alternatively, the anomaly rules 632 may be stored in a different location, separate from the BMC 604, to which the BMC 604 has access.

There are many different types of anomaly rules 632 that could be defined in accordance with the present disclosure. As an example, an anomaly rule 632 could be defined that identifies a maximum level of utilization for the host processor 606. Whenever the BMC 604 determines that the utilization of the host processor 606 exceeds this defined maximum level, the BMC 604 may determine that an anomaly has occurred.

As another example, an anomaly rule 632 could be defined that identifies a maximum temperature for the host processor 606. Whenever the BMC 604 determines that the temperature of the host processor 606 exceeds this defined maximum level, the BMC 604 may determine that an anomaly has occurred.

As another example, an anomaly rule 632 could be defined that identifies a list of processes that are authorized to run on the host computing device 602. If the BMC 604 identifies a process running on the host computing device 602 that is not included in the list of authorized processes, the BMC 604 may determine that an anomaly has occurred.

As another example, an anomaly rule 632 may include a list of devices 642 (e.g., storage devices, peripheral devices) that should be active on the host computing device 602. In this context, a device 642 may be considered to be active on the host computing device 602 if the device 642 is accessible to the host processor 606. If the BMC 604 determines that one or more of these devices 642 is not currently active, then the BMC 604 may determine that an anomaly has occurred.

The BMC 604 may monitor the operating characteristics of the host computing device 602 based on the anomaly rules 632 that have been defined. For example, if there is an anomaly rule 632 that identifies a maximum level of utilization for the host processor 606, then the BMC 604 may monitor the actual utilization of the host processor 606. If there is an anomaly rule 632 that identifies a maximum temperature for the host processor 606, then the BMC 604 may monitor the actual temperature of the host processor 606. If there is an anomaly rule 632 that includes a list of processes that are authorized to run on the host computing device 602, then the BMC 604 may monitor the processes that are actually running on the BMC 604. If there is an anomaly rule 632 that includes a list of devices 642 that should be active on the host computing device 602, then the BMC 604 may monitor those devices 642 to see whether they are currently active.

In some embodiments, the BMC 604 may monitor the operating characteristics of the host computing device 602 based on the defined anomaly rules 632 independently of receiving any communication from another entity, such as a fabric controller 620. In other words, the BMC 604 may monitor the operating characteristics of the host computing device 602 based on the defined anomaly rules 632 even if the BMC 604 is not specifically instructed to do so by the fabric controller 620 or any other entity. Alternatively, in other embodiments, the BMC 604 may monitor the operating characteristics of the host computing device 602 in response to receiving one or more commands from the fabric controller 620 or another administrative-level entity that exercises control over the host computing device 602.

If the BMC 604 determines that an anomaly associated with the host computing device 602 has occurred based on the anomaly rules 632 that have been defined, the BMC 604 may initiate one or more diagnostic operations that are performed with respect to the host computing device 602. This may be accomplished in the manner described previously. For example, the BMC 604 may enable a communication interface 608 from the BMC 604 to the host processor 606 and then provide input 610 to the host processor 606 via the communication interface 608. The input 610 may cause one or more diagnostic operations to be performed on the host computing device 602, as described above. The diagnostic operation(s) may be performed by a diagnostic agent 612 that is stored in memory 614 within the host computing device 602 and executed by the host processor 606.

Once the diagnostic operation(s) have been performed on the host computing device 602, the BMC 604 can then collect host information 616. The host information 616 may be received, for example, from the diagnostic agent 612 on the host computing device 602 via the communication interface 608. Once the host information 616 has been collected, the BMC 604 can then send the host information 616 to another entity, such as the fabric controller 620. The system 600 shown in FIG. 6 includes both a data plane communication channel 622 and a control plane communication channel 624 between the fabric controller 620 and the host computing device 602. The fabric controller 620 includes a data plane interface 626 and a control plane interface 628. The BMC 604 can send the host information 616 to the fabric controller 620 via the control plane communication channel 624. Alternatively, if the fabric controller 620 is accessible to the host computing device 602 via the data plane communication channel 622, the BMC 604 can cause the host information 616 to be sent to the fabric controller 620 via the data plane communication channel 622. The host information 616 can also be stored in persistent memory 636 within the BMC 604 or elsewhere.

Figure 7:
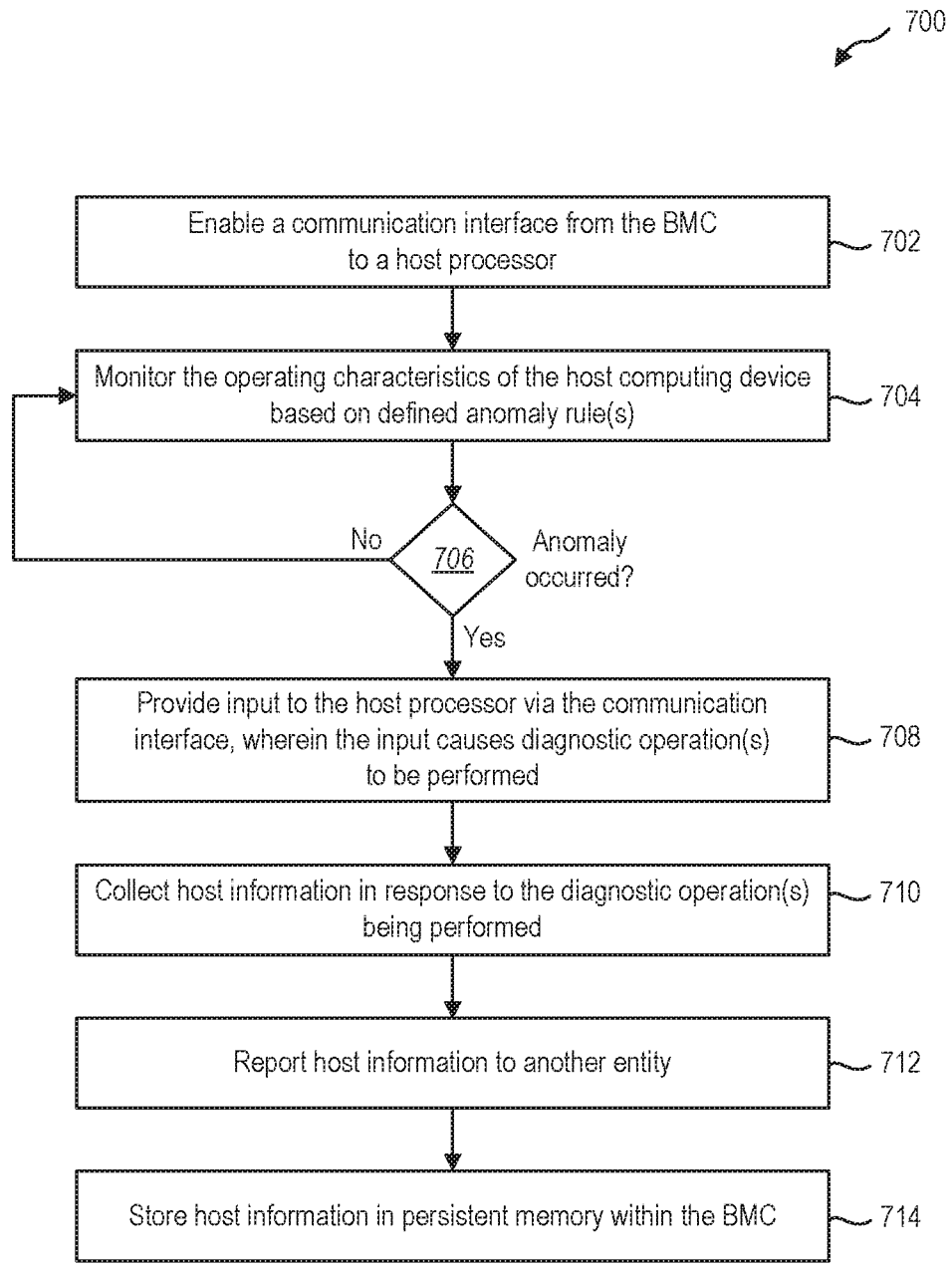
FIG. 7 illustrates an example of a method in which a BMC initiates diagnostic operations with respect to a host computing device in response to detecting an anomaly associated with the host computing device.

FIG. 7 illustrates an example of a method 700 in which a BMC 604 initiates diagnostic operations with respect to a host computing device 602 in response to detecting an anomaly associated with the host computing device 602. The method 700 will be described in relation to the system 600 shown in FIG. 6. The method 700 may be performed by the BMC 604 in the system 600 shown in FIG. 6.

In accordance with the method 700, the BMC 604 enables 702 a communication interface 608 from the BMC 604 to a host processor 606 on a host computing device 602. As discussed above, enabling 702 the communication interface 608 may include causing the host processor 606 to enumerate a particular type of device (e.g., a USB input device, a PCI-e endpoint device).

The method 700 also includes the BMC 604 monitoring 704 the operating characteristics of the host computing device 602 based on one or more defined anomaly rules 632. If the BMC 604 determines 706, based on the defined anomaly rules 632, that an anomaly associated with the host computing device 602 has occurred, the BMC 604 may initiate one or more diagnostic operations on the host computing device 602 by providing 708 input 610 to the host processor 606 via the previously enabled communication interface 608. The input 610 causes one or more diagnostic operations to be performed on the host computing device 602. The diagnostic operation(s) may be performed by a diagnostic agent 612 on the host computing device 602.

The BMC 604 may then collect 710 host information 616 in response to the diagnostic operation(s) being performed. The BMC 604 may receive the host information 616 from the diagnostic agent 612 via the communication interface 608. The BMC 604 can report 712 the host information 616 to another entity, such as a fabric controller 620. The BMC 604 can send the host information 616 to the fabric controller 620 via the control plane communication channel 624. Alternatively, if the fabric controller 620 is accessible to the host computing device 602 via the data plane communication channel 622, the BMC 604 can cause the host information 616 to be sent to the fabric controller 620 via the data plane communication channel 622. The BMC 604 can also store 714 the host information 616 in persistent memory 636 within the BMC 604 itself.

Figure 8:
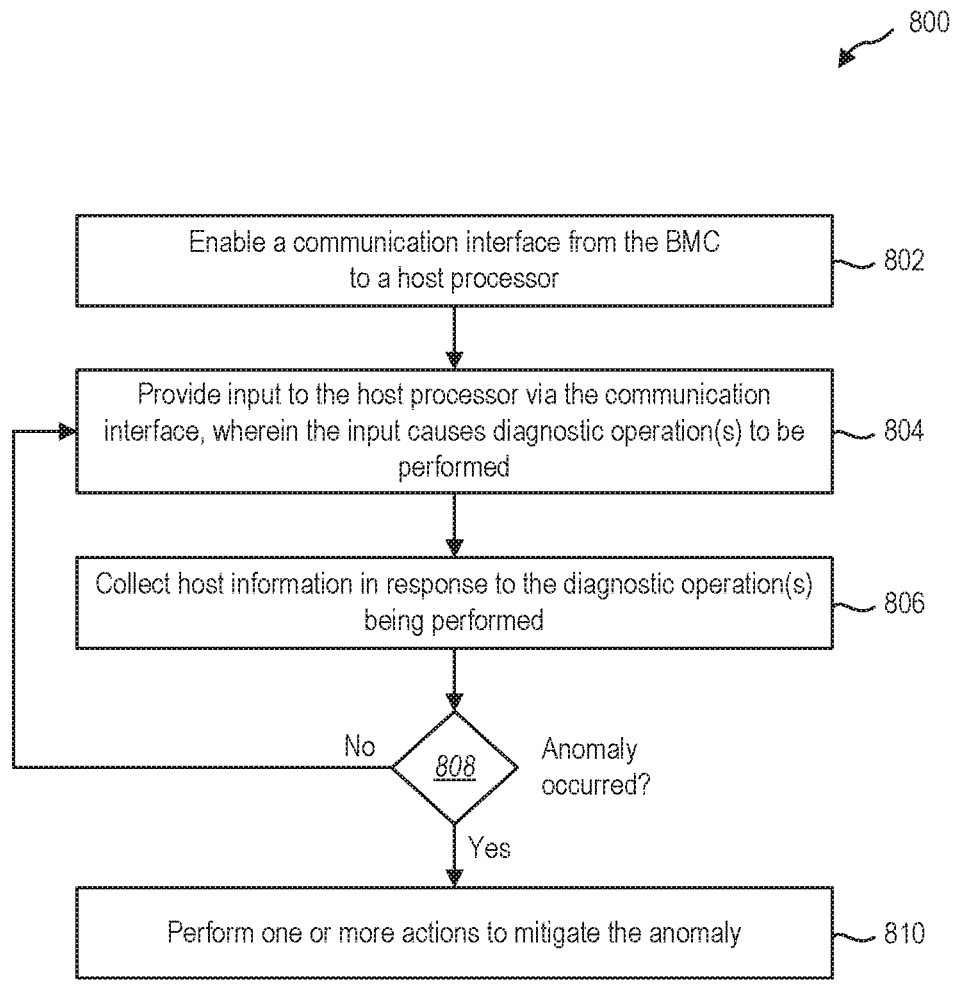
FIG. 8 illustrates an example of a method in which a BMC proactively initiates diagnostic operations with respect to a host computing device.

FIG. 8 illustrates an example of a method 800 in which a BMC 604 proactively initiates diagnostic operations with respect to a host computing device 602. The method 800 will be described in relation to the system 600 shown in FIG. 6. The method 700 may be performed by the BMC 604 in the system 600 shown in FIG. 6.

In accordance with the method 800, the BMC 604 enables 802 a communication interface 608 from the BMC 604 to a host processor 606 on a host computing device 602. The method 800 also includes the BMC 604 initiating one or more diagnostic operations on the host computing device 602 by providing 804 input 610 to the host processor 606 via the communication interface 608. In some embodiments, the BMC 604 may periodically initiate diagnostic operation(s) on the host computing device 602 by periodically providing 804 input 610 to the host processor 606 via the communication interface 608. The input 610 causes one or more diagnostic operations to be performed on the host computing device 602. The diagnostic operation(s) may be performed by a diagnostic agent 612 on the host computing device 602.

The BMC 604 may then collect 806 host information 616 in response to the diagnostic operation(s) being performed. The BMC 604 may receive the host information 616 from the diagnostic agent 612 via the communication interface 608.

The BMC 604 then determines 808, based at least in part on the host information 616 that is collected by the BMC 604 as well as the defined anomaly rules 632, whether an anomaly associated with the host computing device 602 has occurred. If the BMC 604 determines 808 that an anomaly associated with the host computing device 602 has not occurred, then the BMC 604 can wait for a certain period of time before initiating additional diagnostic operations on the host computing device 602. The amount of time that the BMC 604 waits before initiating additional diagnostic operations on the host computing device 602 may be pre-defined and stored in the persistent memory 636 of the BMC 604.

If, however, the BMC 604 determines 808 that an anomaly associated with the host computing device 602 has occurred, then the BMC 604 can perform 810 one or more actions to mitigate the anomaly. There are many different types of actions that can be taken in accordance with the present disclosure depending on the type of anomaly that is detected. As an example, suppose that an anomaly rule 632 includes a list of processes that are authorized to run on the host computing device 602, and the host information 616 indicates that at least one unauthorized process is running on the host computing device 602. In response to detecting such an anomaly, the BMC 604 may provide input 610 to the host computing device 602 that causes the unauthorized process(es) to be terminated.

As another example, suppose that an anomaly rule 632 identifies a maximum level of utilization for the host processor 606, and the host information 616 indicates that the actual utilization of the host processor 606 exceeds this defined maximum level. In response to detecting such an anomaly, the BMC 604 may provide input 610 to the host computing device 602 that causes the utilization of the host processor 606 to be reduced. For example, the BMC 604 may provide input 610 to the host computing device 602 that causes one or more processes running on the host computing device 602 to be terminated.

As another example, suppose that an anomaly rule 632 identifies a maximum temperature for the host processor 606, and the host information 616 indicates that the actual utilization of the host processor 606 exceeds this defined maximum level. In response to detecting such an anomaly, the BMC 604 may provide input 610 to the host computing device 602 that causes the temperature of the host processor 606 to be reduced. For example, the BMC 604 may provide input 610 to the host computing device 602 that causes one or more processes running on the host computing device 602 to be terminated and/or causes one or more cooling fans within the host computing device 602 to be activated.

As another example, suppose that an anomaly rule 632 includes a list of devices 642 (e.g., storage devices, peripheral devices) that should be active on the host computing device 602, and the host information 616 indicates that one or more of these devices 642 is not currently active. In response to detecting such an anomaly, the BMC 604 may provide input 610 to the host computing device 602 that causes the inactive device(s) 642 to be reset.

If the anomaly is that an operating system on the host computing device 602 is unresponsive, the BMC 604 can attempt recovery via the communication interface 608. The BMC 604 can also try to collect as much host information 616 as possible for debugging. The BMC 604 can also trigger one or more non-maskable interrupts (NMIs) and read one or more machine state registers (MSRs) on the host computing device 602.

Figure 9:
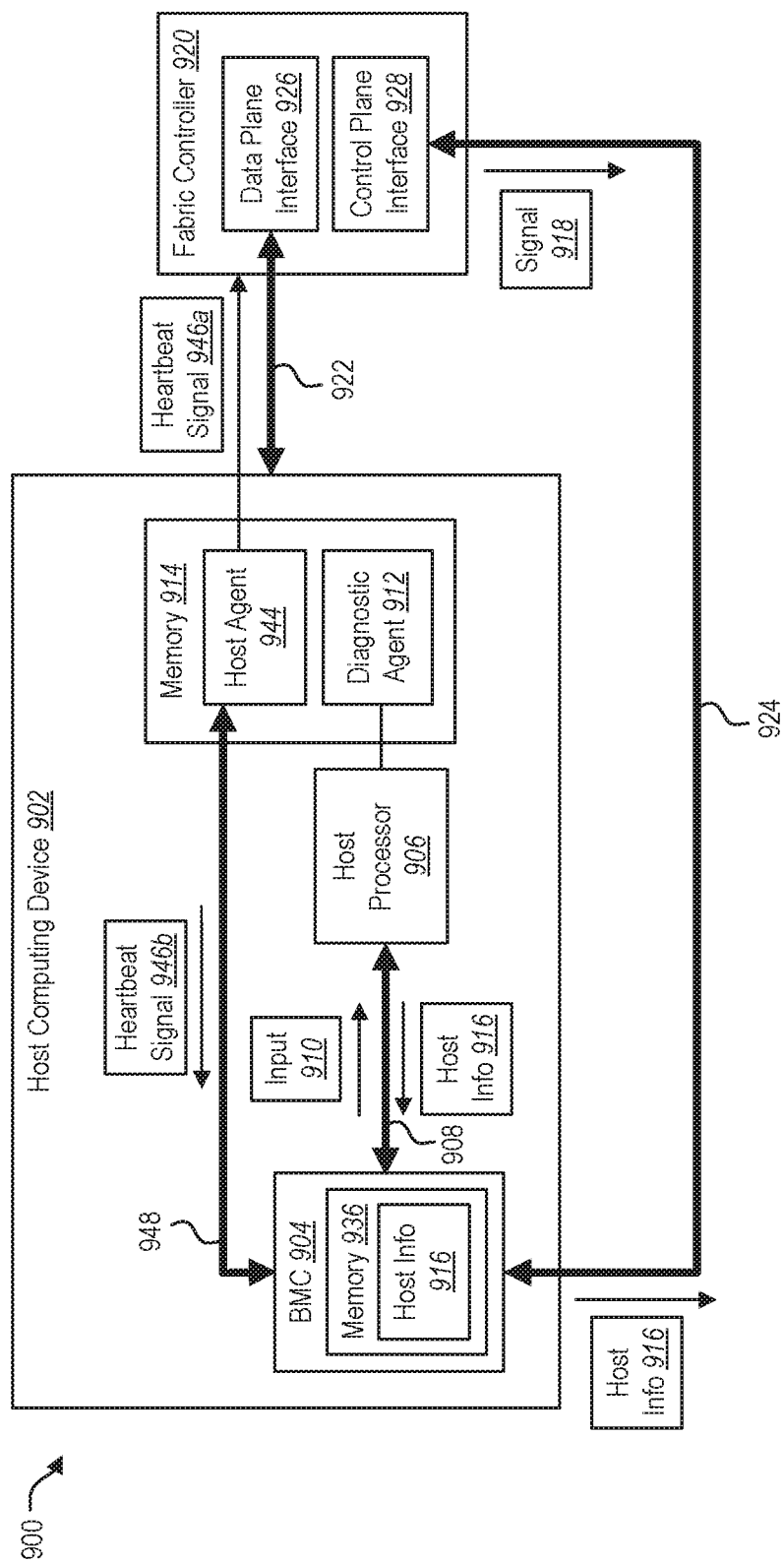
FIG. 9 illustrates an example of a system in which a host agent is configured to provide at least two different heartbeat signals.

FIG. 9 illustrates an example of a system 900 in which a host agent 944 is configured to provide at least two different heartbeat signals 946a-b. The system 900 is similar in some respects to the systems 300, 600 described previously. For example, the system 900 includes a host computing device 902 that is in electronic communication with a fabric controller 920 via a data plane communication channel 922. The host computing device 902 includes a BMC 904 that is in electronic communication with the fabric controller 920 via the control plane communication channel 924. The fabric controller 920 includes a data plane interface 926 for communicating with the host computing device 902 via the data plane communication channel 922, and a control plane interface 928 for communicating with the BMC 904 via the control plane communication channel 924.

In the depicted system 900, a host agent 944 is shown in memory 914 of the host computing device 902. The host agent 944 is executable by the host processor 906 to perform the functionality that is described herein in connection with the host agent 944.

The host agent 944 is configured to send a heartbeat signal 946a to the fabric controller 920 via the data plane communication channel 922. The host agent 944 is also configured to send a heartbeat signal 946b to the BMC 904 on the host computing device 902.

The heartbeat signals 946a-b may be sent periodically. If the heartbeat signals 946a-b are not received when they are expected to be received, the BMC 904 may initiate one or more diagnostic operations, either on its own or at the request of the fabric controller 920.

For example, suppose that the fabric controller 920 expects to receive the heartbeat signal 946a from the host agent 944 at regular time intervals, which may be represented as $T_{heartbeat}$. If the fabric controller 920 does not receive the heartbeat signal 946a from the host agent 944 for a period of time that exceeds $T_{heartbeat}$, this may indicate that there is some problem with the host computing device 902 and/or with the data plane communication channel 922. Therefore, if the fabric controller 920 does not receive the heartbeat signal 946a from the host agent 944 for a period of time that exceeds $T_{heartbeat}$, the fabric controller 920 may instruct the BMC 904 (via the control plane communication channel 924) to initiate one or more diagnostic operations. FIG. 9 shows the fabric controller 920 sending a signal 918 to the BMC 904, via the control plane communication channel 924, that causes the BMC 904 to initiate one or more diagnostic operations.

As another example, suppose that the BMC 904 expects to receive the heartbeat signal 946b from the host agent 944 at regular time intervals, which may be represented by $T_{heartbeat}$. If the BMC 904 does not receive the heartbeat signal 946b from the host agent 944 for a period of time that exceeds $T_{heartbeat}$, this may indicate that there is some problem with the host agent 944 and/or with another aspect of the host computing device 902. Therefore, if the BMC 904 does not receive the heartbeat signal 946b from the host agent 944 for a period of time that exceeds $T_{heartbeat}$, the BMC 904 may initiate one or more diagnostic operations on the host computing device 902.

The BMC 904 may initiate diagnostic operations in the manner described above. For example, the BMC 904 may enable a communication interface 908 from the BMC 904 to the host processor 906 and provide input 910 to the host processor 906 via the communication interface 908. The input 910 may cause one or more diagnostic operations to be performed on the host computing device 902. The diagnostic operation(s) may be performed by a diagnostic agent 912 that is stored in memory 914 of the host computing device 902. The BMC 904 can receive host information 916 from the diagnostic agent 912 in response to the diagnostic operation(s) that are performed. The BMC 904 can report the host information 916 to another entity, such as the fabric controller 920 (e.g., via the control plane communication channel 924), and/or store the host information 916 in persistent memory 936 within the BMC 904 itself.

As indicated above, the host computing device 902 includes both a host agent 944 and a diagnostic agent 912. The host agent 944 may be distinct from the diagnostic agent 912. In addition to sending the heartbeat signals 946a-b, the host agent 944 may be configured to monitor the host computing device 902 and send information to the fabric controller 920 about the health of the host computing device 902. In contrast, as discussed above, the diagnostic agent 912 may be configured to perform diagnostic operation(s) on the host computing device 902 in response to input 910 from the BMC 904.

FIG. 9 shows the host agent 944 sending the heartbeat signal 946b to the BMC 904 via an interface 948 that is different from the communication interface 908 through which the BMC 904 provides the input 910 that causes diagnostic operation(s) to be performed. Thus, the communication interface 908 through which the BMC 904 provides the input 910 that causes diagnostic operation(s) to be performed is not necessarily the only interface between the BMC 904 and the host processor 906. In other words, the BMC 904 may be able to communicate with the host processor 906 using other mechanisms besides the communication interface 908. However, the communication interface 908 allows certain types of input 910 to be provided that are recognized as instructions that cause the diagnostic agent 912 to perform diagnostic operation(s).

Figure 10:
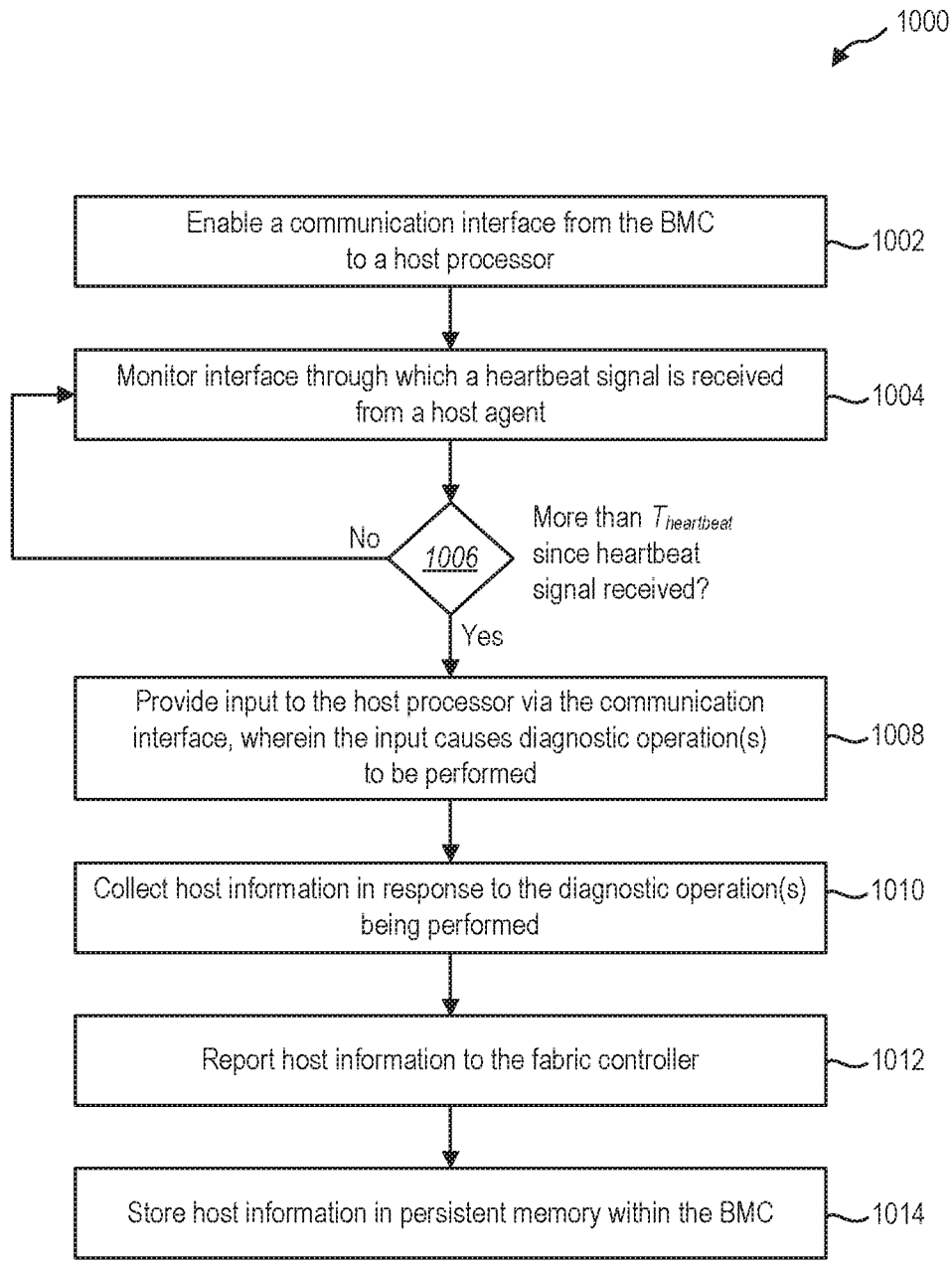
FIG. 10 illustrates an example of a method that may be performed by the BMC in the system shown in FIG. 9.

FIG. 10 illustrates an example of a method 1000 that may be performed by the BMC 904 in the system 900 shown in FIG. 9. The method 1000 includes enabling 1002 a communication interface 908 from the BMC 904 to a host processor 906 on a host computing device 902. As discussed above, this may involve causing the host processor 906 to enumerate a particular type of device (e.g., a USB input device, a PCI-e endpoint device) and to interact with the BMC 904 as if the BMC 904 were the enumerated device.

The method 1000 also includes monitoring 1004 another interface 948 through which the BMC 904 receives a heartbeat signal 946b from the host computing device 902 (e.g., from a host agent 944 on the host computing device 902). As discussed above, this interface 948 may be separate from the communication interface 908 that was previously enabled 1002 in accordance with the method 1000.

The method 1000 also includes determining 1006 whether the amount of time since the BMC 904 has received a heartbeat signal 946b from the host computing device 902 exceeds a pre-defined time duration, which may be represented as $T_{heartbeat}$. If not, then the method 1000 may include continuing to monitor 1004 the interface 948 through which the BMC 904 receives the heartbeat signal 946b.

If, however, the BMC 904 determines 1006 that the amount of time since the BMC 904 has received a heartbeat signal 946b from the host computing device 902 exceeds $T_{heartbeat}$, then the BMC 904 may provide 1008 input 910 to the host processor 906 via the communication interface 908.

The input 910 may cause one or more diagnostic operations to be performed on the host computing device 902, as described above. The diagnostic operation(s) may be performed by a diagnostic agent 912 on the host computing device 902.

The BMC 904 may then collect 1010 host information 916 in response to the diagnostic operation(s) being performed. The BMC 904 may receive the host information 916 from the diagnostic agent 912 via the communication interface 908. The BMC 904 can report 1012 the host information 916 to another entity, such as a fabric controller 920. The BMC 904 can send the host information 916 to the fabric controller 920 via the control plane communication channel 924. The BMC 904 can also store 1014 the host information 916 in persistent memory 936 within the BMC 904 itself.

Figure 11:
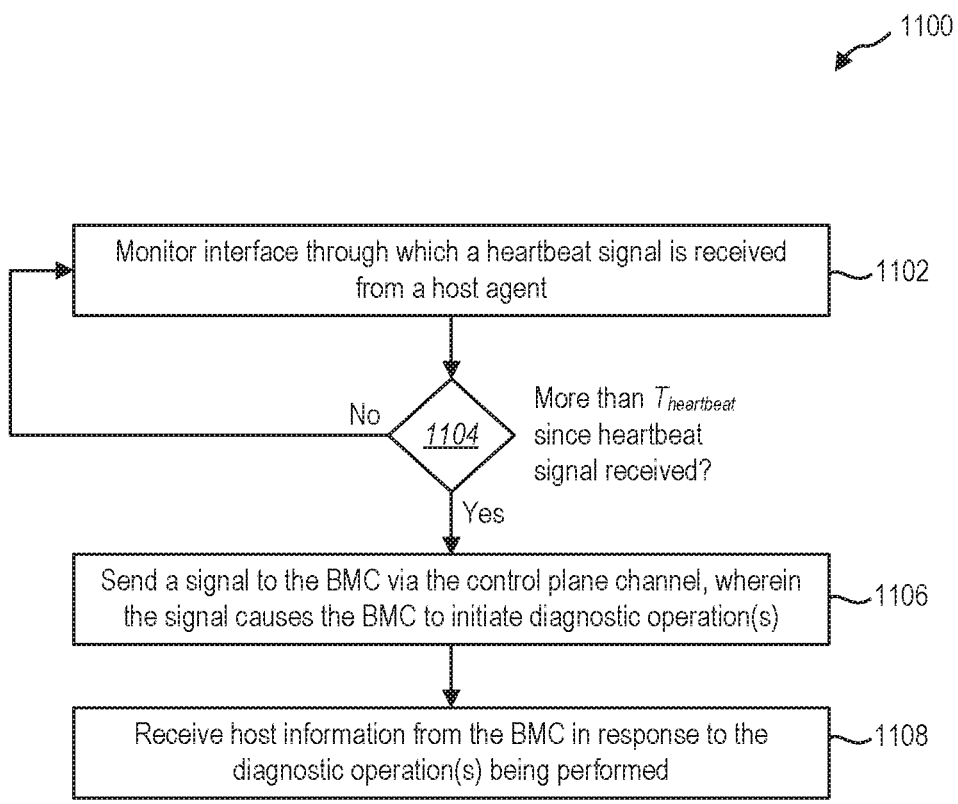
FIG. 11 illustrates an example of a method that may be performed by the fabric controller in the system shown in FIG. 9.

FIG. 11 illustrates an example of a method 1100 that may be performed by the fabric controller 920 in the system 900 shown in FIG. 9. The method 1100 includes monitoring 1102 an interface (e.g., a data plane interface 926) through which the fabric controller 920 receives a heartbeat signal 946a from a host agent 944 on the host computing device 902.

The method 1100 also includes determining 1104 whether the amount of time since the fabric controller 920 has received a heartbeat signal 946a from the host agent 944 exceeds a pre-defined time duration, which may be represented as $T_{heartbeat}$. If not, then the method 1100 may include continuing to monitor 1102 the interface through which the fabric controller 920 receives the heartbeat signal 946a.

If, however, the fabric controller 920 determines 1104 that the amount of time since the fabric controller 920 has received a heartbeat signal 946a from the host agent 944 exceeds $T_{heartbeat}$, then the fabric controller 920 may send 1106 a signal 918 to the BMC 904 via the control plane communication channel 924. As discussed above, the signal 918 may instruct the BMC 904 to initiate one or more diagnostic operations in an attempt to find out why the heartbeat signal 946a has not been received. In response to receiving this signal 918 from the fabric controller 920, the BMC 904 may initiate one or more diagnostic operations. The BMC 904 may then collect host information 916 in response to the diagnostic operation(s) being performed and report this host information 916 to the fabric controller 920. Thus, the method 1100 may include receiving 1108 host information 916 from the BMC 904 in response to the diagnostic operation(s) being performed.

Figure 12:
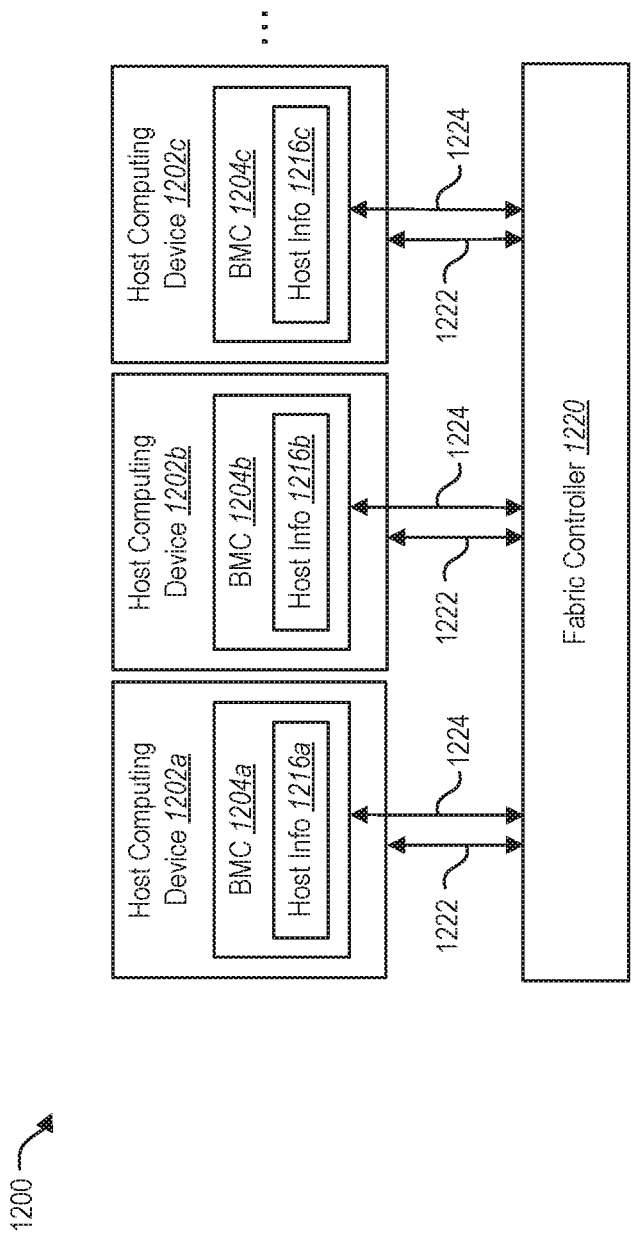
FIG. 12 illustrates an example of a system in which BMCs on a plurality of host computing devices report host information to a fabric controller.

As indicated above, the techniques disclosed herein may be utilized in a cloud computing system in which a fabric controller is responsible for managing a large number of host computing devices. FIG. 12 illustrates an example of a system 1200 that includes a plurality of host computing devices 1202a-c. For simplicity, only three host computing devices 1202a-c are shown in the depicted system 1200. However, a fabric controller may be responsible for managing a very large number (e.g., hundreds or thousands) of host computing devices.

The host computing devices 1202a-c in the depicted system 1200 include BMCs 1204a-c that are configured to collect host information 1216a-c in accordance with the techniques disclosed herein. The BMCs 1204a-c on the various host computing devices 1202a-c may report the host information 1216a-c to the fabric controller 1220. Thus, the fabric controller 1220 may collect host information 1216a-c from a plurality of host computing devices 1202a-c.

The host computing devices 1202a-c are each in communication with the fabric controller 1220 via a data plane communication channel 1222. In addition, the BMCs 1204a-c on the host computing devices 1202a-c are each in communication with the fabric controller 1220 via a control plane communication channel 1224. In some embodiments, the BMCs 1204a-c on the host computing devices 1202a-c may report the host information 1216a-c to the fabric controller 1220 via the control plane communication channel 1224, as described above.

In some embodiments, machine learning techniques may be utilized to analyze the host information host information 1216a-c and determine information that can improve the performance of the overall cloud computing system.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

As used herein, the term "processor" may refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor may be a central processing unit (CPU). In some embodiments, a combination of processors (e.g., an ARM and DSP) could be used to implement some or all of the techniques disclosed herein.

As used herein, the term "memory" may be any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A baseboard management controller (BMC), comprising:
    a processor;
    memory in electronic communication with the processor; and
    instructions stored in the memory and executable by the processor to:
        enable a communication interface from the BMC to a host processor on a host computing device;
        provide input to the host processor via the communication interface, wherein the input is provided to the host processor in response to at least one of receiving a signal from a fabric controller or determining that a heartbeat signal has not been received from a host agent on the host computing device within a pre-defined time period, and wherein the input causes at least one diagnostic operation to be performed on the host computing device; and
        collect host information in response to the at least one diagnostic operation.

2. The BMC of claim 1, wherein the input is provided to the host processor in response to detecting an anomaly associated with the host computing device.

3. The BMC of claim 1, further comprising additional instructions that are stored in the memory and executable by the processor to:
    determine, based on the host information and also based on at least one anomaly rule, that an anomaly associated with the host computing device has occurred; and
    take at least one action to mitigate the anomaly.

4. The BMC of claim 1, wherein:
    the input causes a diagnostic agent on the host computing device to be executed by the host processor; and
    the at least one diagnostic operation is performed via execution of the diagnostic agent.

5. The BMC of claim 1, wherein:
    the host computing device communicates with the fabric controller via a data plane communication channel; and
    the BMC further comprises additional instructions that are stored in the memory and executable by the processor to send the host information to the fabric controller via a control plane communication channel that is separate from the data plane communication channel.

6. The BMC of claim 1, wherein the BMC further comprises:
    persistent memory; and
    additional instructions that are stored in the memory and executable by the processor to store the host information in the persistent memory.

7. The BMC of claim 1, wherein:
    the communication interface comprises a Universal Serial Bus (USB) interface; and
    enabling the communication interface comprises causing the host processor to enumerate a USB input device.

8. The BMC of claim 1, wherein:
    the communication interface comprises a Peripheral Component Interconnect Express (PCI-e) interface; and
    enabling the communication interface comprises causing the host processor to enumerate a PCI-e endpoint.

9. A host computing device, comprising:
    a host processor;
    host memory in electronic communication with the host processor;
    a diagnostic agent stored in the host memory and executable by the host processor to perform at least one diagnostic operation on the host computing device;
    a baseboard management controller (BMC) that comprises a BMC processor and memory that is accessible to the BMC processor;
    a host agent stored in the host memory and executable by the host processor to send a heartbeat signal to the BMC;
    anomaly rules stored in the memory, wherein the anomaly rules indicate when anomalies associated with the host computing device have occurred; and
    instructions stored in the memory and executable by the BMC processor to:
        enable a communication interface from the BMC to the host processor;
        monitor operating characteristics of the host computing device based at least in part on the anomaly rules;
        determine, as a result of monitoring the operating characteristics of the host computing device, that an anomaly associated with the host computing device has occurred;
        provide input to the host processor via the communication interface in response to determining that the anomaly has occurred, the input being provided to the host processor in response to determining that the heartbeat signal has not been received from the host agent within a pre-defined time period, the input being configured to cause the diagnostic agent to perform the at least one diagnostic operation; and
        collect host information in response to the at least one diagnostic operation.

10. The host computing device of claim 9, wherein the input is provided to the host processor in response to receiving a signal from a fabric controller.

11. The host computing device of claim 9, wherein the input is provided to the host processor in response to detecting the anomaly associated with the host computing device.

12. The host computing device of claim 9, wherein the BMC is additionally configured to:
    determine, based on the host information and also based on at least one anomaly rule, that the anomaly associated with the host computing device has occurred; and
    take at least one action to mitigate the anomaly.

13. The host computing device of claim 9, wherein:
the input causes the diagnostic agent to be executed by the host processor; and
the at least one diagnostic operation is performed via execution of the diagnostic agent.

14. The host computing device of claim 9, wherein:
the host computing device communicates with a fabric controller via a data plane communication channel; and
the BMC is additionally configured to send the host information to the fabric controller via a control plane communication channel that is separate from the data plane communication channel.

15. The host computing device of claim 9, wherein:
the BMC further comprises persistent memory; and
the BMC is additionally configured to store the host information in the persistent memory.

16. A fabric controller, comprising:
a data plane interface that facilitates communication with a host computing device via a data plane communication channel;
a control plane interface that facilitates communication with a baseboard management controller (BMC) on the host computing device via a control plane communication channel;
a processor;
memory in electronic communication with the processor; and
instructions stored in the memory, the instructions being executable by the processor to:
send a signal to the BMC via the control plane interface, wherein the signal causes the BMC to initiate at least one diagnostic operation on the host computing device; and
receive host information from the BMC via the control plane interface.

17. The fabric controller of claim 16, wherein the signal is sent in response to detecting that the host computing device is not accessible via the data plane interface.

* * * * *